W. HOLLADAY.
GRAIN-SEPARATOR.
No. 180,236.  Patented July 25, 1876.
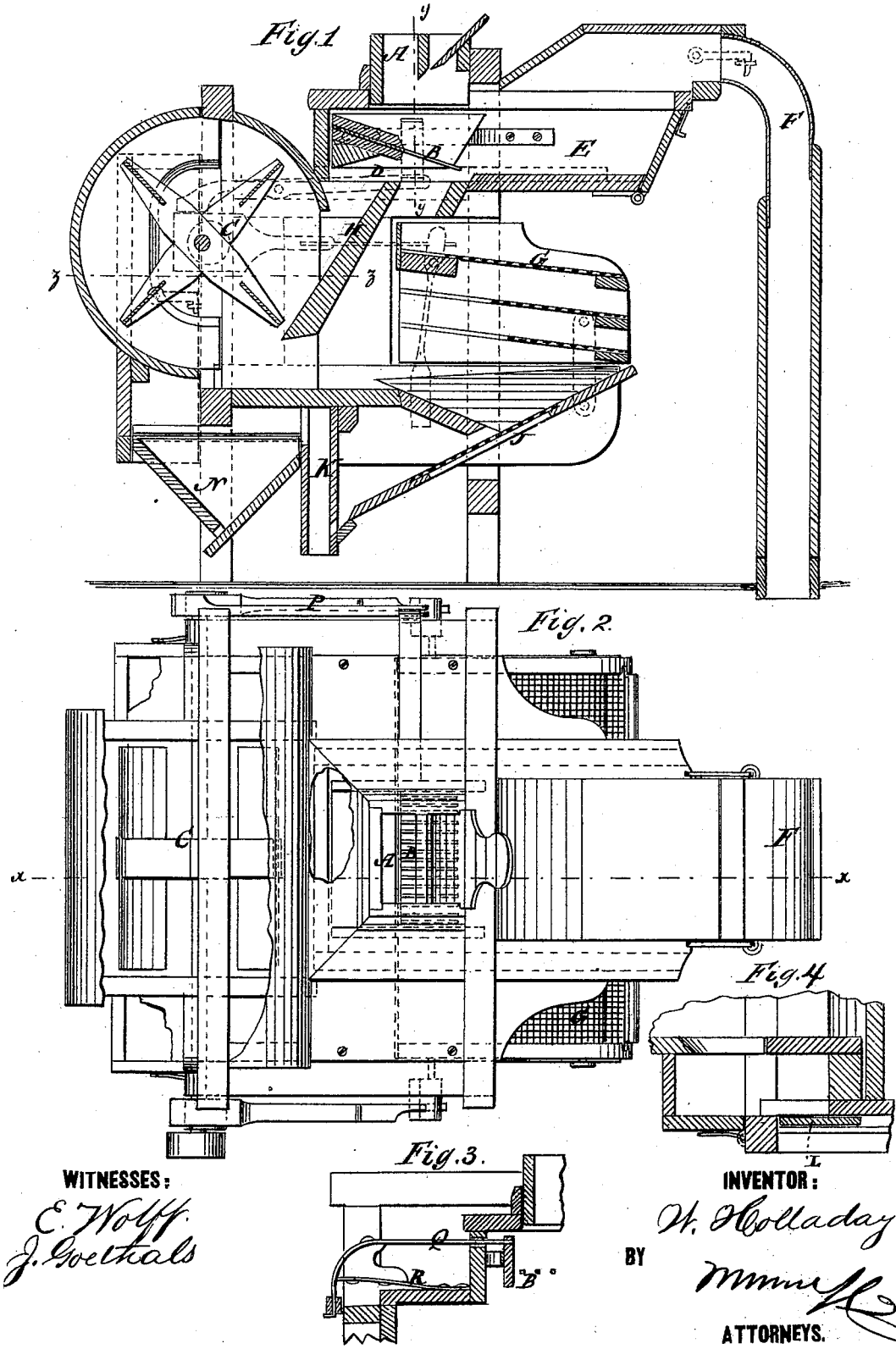

UNITED STATES PATENT OFFICE.

WILLIAM HOLLADAY, OF BLAIRSTOWN, IOWA.

IMPROVEMENT IN GRAIN-SEPARATORS.

Specification forming part of Letters Patent No. 180,236, dated July 25, 1876; application filed January 4, 1876.

*To all whom it may concern:*

Be it known that I, WILLIAM HOLLADAY, of Blairstown, in the county of Benton and State of Iowa, have invented a new and Improved Fanning-Mill, of which the following is a specification:

My invention consists of contrivance for separating the light coarse matters, and also the dust, before the grain goes onto the sieves, and conducting them away in a tube out of the room containing the mill.

By separating the straw, &c., before coming to the sieves, the capacity of the mill is greatly increased, in consequence of the sieves not being choked by such matters.

The invention also consists of a valve or gate, in combination with the contrivance for taking out the straw, &c., and the sieves, whereby the blast can be wholly turned on either device, or partly on both; and it also consists of a contrivance whereby a blast may be applied by suction to the grain as it passes off from the screen for separating light grains and the like matters not separated by the mill proper.

Figure 1 is a longitudinal sectional elevation of my improved fanning-mill, taken on the line $x\ x$ of Fig. 2. Fig. 2 is partly a plan view and partly a horizontal section, and Figs. 3 and 4 are details in section.

Similar letters of reference indicate corresponding parts.

A is the spout or mouth through which the grain is fed into the mill, so as to fall on the inclined and laterally-shaking rake B, whereon it encounters a blast from fan C up along passage D, which blows the dust, straw, and other light matters off through the settling-chamber E and conductor F, out of the room, leaving the room free from dust, leaving the grain free of such matters as naturally clog the screens G, to flow onto them from the rake B and settling-chamber E, and there receive the wind-blast from the fan, in the usual way, for blowing out the chess and the like, which will be more rapidly accomplished on account of their clearer condition.

The wind from fan C can be so controlled by gate H as to throw it all through the rake B, or admit whatever quantity is wanted through the sieves G, and regulate it among the sieves as the quality of grain requires.

From the screen J the grain is made to fall into the spout K, up which a suction is produced by shutting the gates L to the fan-case, so that the fan is compelled to take in the air at the spout, which separates the light matters by taking them over into hopper N. The sieve-shoe is to be provided with an adjustable connection of the end shaking contrivance, to regulate the action as desired.

The rake B has shaking motion imparted to it by causing the connecting-rod P to lift the outer end of spring Q, which is connected by its other end to the rake, and is also connected to spring R, so that being so lifted also gives endwise motion.

Having thus described my invention, I claim as new and desire to secure by Letters Patent—

1. The reciprocating rake B, arranged in the throat of the hopper, in connection with air-passage D and settling-chamber E, to separate the straws, dust, and other light matters before the grain passes onto the sieves, substantially as specified.

2. The combination of the conductor-spout F, settling-chamber E, and fan C, substantially as specified.

3. The adjustable gate H, in combination with sieves G and reciprocating rake B, substantially as specified.

4. The spout K, having an open lower end and passages in its sides near the bottom and at the top, in combination with the hopper N, fan C, and screen J, all arranged substantially as set forth.

5. The springs Q and R, combined with rake B and connecting-rod P, substantially as specified.

WILLIAM HOLLADAY.

Witnesses:
W. S. SNOW,
JNO. D. PATTEN.